United States Patent [19]

Gutek

[11] Patent Number: 4,845,164

[45] Date of Patent: Jul. 4, 1989

[54] LIQUID CURABLE POLYORGANOSILOXANE COMPOSITIONS

[75] Inventor: Beth I. Gutek, Freeland, Mich.

[73] Assignee: Dow Corning Corporation, Midland, Mich.

[21] Appl. No.: 927,997

[22] Filed: Nov. 7, 1986

Related U.S. Application Data

[63] Continuation-in-part of Ser. No. 835,817, Mar. 3, 1986, abandoned.

[51] Int. Cl.$^4$ ............................................. C08G 77/06
[52] U.S. Cl. ........................................ 528/15; 528/31; 528/32; 525/478
[58] Field of Search ............................ 528/15, 31, 32; 525/478

[56] References Cited

U.S. PATENT DOCUMENTS

| | | | |
|---|---|---|---|
| 3,284,406 | 11/1966 | Nelson | 260/46.5 |
| 3,436,366 | 4/1969 | Modic | 260/37 |
| 3,697,473 | 10/1972 | Polmanteer et al. | 260/37 SB |
| 3,957,717 | 5/1976 | Harada et al. | 528/862 |
| 4,340,709 | 7/1982 | Jeram et al. | 528/15 |
| 4,472,470 | 9/1984 | Modic | 428/145 |
| 4,484,179 | 11/1984 | Kasday | 340/365 P |
| 4,535,141 | 8/1985 | Kroupa | 528/15 |

Primary Examiner—John C. Bleutge
Assistant Examiner—Ralph H. Dean, Jr.
Attorney, Agent, or Firm—Robert Spector

[57] ABSTRACT

The curable polyorganosiloxane compositions of this invention comprise at least one vinyl-terminated liquid polydiorganosiloxane, a resinous organosiloxane reinforcing agent that includes diorganovinylsiloxy, triorganosiloxy and $SiO_2$ units, an organosiloxane curing agent containing an average of at least three silicon-bonded hydrogen atoms per molecule, a diorganohydrogensiloxy terminated polydiorganosiloxane as a chain extender in an amount sufficient to provide from 10 to 85 percent of the silicon-bonded hydrogen atoms in the composition, and a platinum-containing hydrosilation catalyst. The compositions contain at least 1.5 vinyl radicals for each silicon-bonded hydrogen atom present in the composition. The cured elastomer is compressible, resilient and exhibits a hardness value of up to 100 on the Shore 00 durometer scale.

8 Claims, No Drawings

LIQUID CURABLE POLYORGANOSILOXANE COMPOSITIONS

REFERENCE TO COPENDING APPLICATIONS

This application is a continuation-in-part of application Ser. No. 835,817, filed on Mar. 3, 1986, now abandoned.

BACKGROUND OF THE INVENTION

1. Field of the Invention

This invention relates to liquid polyorganosiloxane compositions that cure by a hydrosilation reaction to yield flexible, tough, and optically transparent elastomers.

2. Description of the Prior Art

It is known to prepare liquid or pumpable compositions by blending together a vinyl-containing polydiorganosiloxane, an organohydrogensiloxane curing agent, a platinum-containing catalyst and, optionally, a filler. These compositions can be cured under relatively mild conditions to yield elastomeric or resinous products, depending upon the types and relative concentrations of reactants present in the initial curable composition. The resultant cured products are useful for a variety of applications, including encapsulation of delicate electrical and electronic components, coating of various substrates, as pressure sensitive adhesives, and the formation of shaped articles by injection molding.

Reinforcing fillers such as fume silica have been used to improve the physical properties such as tensile strength, tear strength and modulus of cured polyorganosiloxane compositions.

The prior art teaches using resinous siloxane copolymers as a replacemnt for reinforcing silica fillers to improve the physical properties of cured polyorganosiloxanes while retaining the transparency of an unfilled material. Specifically, U.S. Pat. No. 3,284,406, which issued to Nelson on Nov. 8, 1966, U.S. Pat. No. 3,436,366, which issued to Modic on Apr. 1, 1969, and U.S. Pat. No. 4,472,470, which issued to Modic on Sept. 18, 1984 all disclose using resinous copolymers containing $R_3SiO_{\frac{1}{2}}$, $R_2ViSiO_{\frac{1}{2}}$ and $SiO_{4/2}$ units for this purpose. In the foregoing formulae R represents a monovalent hydrocarbon radical free of ethylenic unsaturation and Vi represents a vinyl radical.

The cured materials disclosed in the aforementioned Nelson and Modic patents typically exhibit hardness values of from 35 to 80 on the Shore A durometer scale, which is indicative of relatively hard, highly crosslinked materials. The aforementioned Modic patents teach inclusion of a finely divided nonreinforcing filler when transparency of the cured article is not a requirement. The curing agents taught by Modic are liquid polyorganohydrogensiloxanes containing at least two silicon-bonded hydrogen atoms per molecule, while the curing agents disclosed in the aforementioned Nelson patent contain at least three silicon-bonded hydrogen atoms per molecule. In addition, the compositions of Nelson contain 0.75 to 1.5 silicon-bonded hydrogen atoms per vinyl radical, which is equivalent to a maximum of 1.3 vinyl radicals per silicon-bonded hydrogen.

A means for increasing the tear strength of cured polyorganosiloxanes prepared from liquid compositions similar to those disclosed in the aforementioned Nelson and Modic patents while maintaining the viscosity of the curable composition within the range from 10 to 500 Pa.s is taught in U.S. Pat. No. 4,340,709 to Jeram and Smith, which issued on July 20, 1982. In accordance with the disclosure of this patent, 100 parts by weight of a liquid polydiorganosiloxane containing from 0.14 to 2.0 mole percent of diorganovinylsiloxy units is cured using the combination of a crosslinking agent and from 75 to 150 parts of a "coupler" containing from 3 to 9 mole percent of dimethylhydrogensiloxy units. The coupler, also referred to by those skilled in the art as a "chain extender", is a linear polydiorganosiloxane containing a silicon-bonded hydrogen atom at each of the two terminal positions of the molecule and no additional silicon bonded hydrogen. The crosslinking agents are defined as "hydride resins having only terminal hydrogen atoms or a linear hydride polysiloxane" containing hydrogen atoms only in the internal portion of each molecule on nonterminal silicon atoms.

In accordance with the claims of the aforementioned Jeram and Smith patent, the highest molar ratio of vinyl radicals to silicon bonded hydrogen atoms occurs when the repeating units of the polydiorganosiloxane are dimethylsiloxane units, this polymer contains 2.0 mole percent of dimethylvinylsiloxy units at the terminal postions, the composition contains 75 parts by weight of coupler per 100 parts of polydiorganosiloxane, and the coupler contains 3.0 mole percent of dimethylhydrogensiloxy units. Under these conditions the composition contains 0.012 vinyl radical per silicon-bonded hydrogen atom. This vinyl content becomes even lower when one includes the silicon-bonded hydrogen atoms present in the crosslinker.

It is therefore evident from the claims in the Jeram and Smith patent that the compositions contain more moles of silicon bonded hydrogen atoms than moles of vinyl radicals.

The cured compositions exemplified by Jeram and Smith exhibit hardness values of from 21 to 43 on the shore A durometer scale after curing for one hour at 100° C. Hardness values in this range are desirable for protective coatings, encapsulating materials and certain types of molded articles.

The concept of using a chain extender containing two silicon-bonded hydrogen atoms per molecule in combination with a curing agent containing an average of in least three silicon-bonded hydrogen atoms to improve the tensile properties of cured polyorganosiloxane elastomers is taught in U.S. Pat. No. 3,697,473, which issued to Polmanteer et al. on Oct. 10, 1972. The chain extender is a polydiorganosiloxane wherein each of the two terminal units contains a silicon bonded hydrogen atom and no additional silicon bonded hydrogen is present in the molecule.

Both the chain extender and the curing agent contain a minimum of 10% of the available silicon-boned hydrogen atoms, and are the only sources of silicon-bonded hydrogen present in the composition.

The curable compositions described by Polmanteer et al. contain from 0.75 to 1.5 silicon bonded hydrogen atom for each vinyl radical present in the polydiroganosiloxane ingredient. In accordance with this teaching a curable composition cannot contain more than 1.3 vinyl radicals per silicon-bonded hydrogen atom. This is the same limit disclosed in the aforementioned Nelson patent.

The elastomers exemplified by Polmanteer et al. exhibit durometer values of from 11 to 38, measured on the Shore A scale.

The tensile properties and hardness values reported in the aforementioned Nelson, Modic, Jeram et al. and Polmanteer et al. patents indicate that the cured articles exemplified in this prior art do not exhibit the compressibility and resiliency required for some applications of polyorganosiloxane elastomers. One such application is as the light transmitting portion of flexible touch position sensitive optical screens of the type disclosed in U.S. Pat. No. 4,484,179, which issued to Kasday on Nov. 20, 1984.

Pressure sensitive optical screens and other types of compressible waveguides require a layer of cured, noncellular elastomer that is transparent, exhibits minimal light attenuation, and can be flexed or otherwise deformed by applying an electrostatic or mechanical force against at least one surface of the article. Polyorganosiloxane elastomers suitable for this application typically exhibit durometer values of 100 or less on the Shore 00 scale, and are considerably softer materials than those measured using the Shore A scale. In addition, the elastomer must be sufficiently resilient to resume its original shape almost immediately following release of the pressure which deformed it, and sufficiently tough to resist being punctured and/or torn when this pressure is repeatedly applied to the same area of the elastomer. It is also essential that the properties of the initially cured elastomer, particularly compressibility and resiliency, do not vary substantially with the passage of time.

If one of more surfaces of a deformable optical waveguide are overlayed with a film or membrane, the adhesion along this interface must be sufficient to prevent separation between the two layers and resultant void formation. The foregoing combination of properties required for optically transparent, deformable optical waveguides has not been disclosed for prior art polyorganosiloxane elastomer compositions.

Optically transparent, curable polyorganosiloxane compositions that include a vinyl terminated polydiorganosiloxane, a resinous organosiloxane copolymer containing dimethylvinylsiloxy, trimethylsiloxy and SiO4/2 units and two types of organohydrogensiloxanes are disclosed in U.S. Pat. No. 4,535,141, which issued to Kroupa on Aug. 13, 1985. One of the organohydrogensiloxanes corresponds to the chain extender of the aforementioned Jeram and Smith patent, and contains silicon bonded hydrogen atoms only at the terminal positions of a substantially linear polydiorganosiloxane molecule. The concentration of chain extender is equivalent to a concentration of silicon bonded hydrogen atoms that is at least 1.6 times the number of vinyl radicals present in the curable composition. The other organohydrogensiloxane functions as a curing agent and contains an average of at least 3 silicon bonded hydrogen atoms per molecule.

The present inventior found the cured elastomers prepared using the compositions described in the aforementioned Kroupa patent to be less than entirely satisfactory materials for compressible optical waveguides because the cured elastomer continues to harden with the passage of time and eventually becomes too hard to be compressed under typical operating conditions for the waveguide. This phenomenon is often accompanied by the appearance of hydrogen gas that interfere with the optical properties of the waveguide. The gradual hardening and generation of hydrogen are believed due to the reaction of the silicon bonded hydrogen atoms present in the elastomer with moisture.

Subsequent investigation has shown the waveguides containing the preferred elastomer compositions disclosed in the aforementioned Kroupa patent to have relatively poor compressive strength. These materials may therefore not be capable of withstanding the repeated compression experienced by a touch sensitive screen of the type described in the aforementioned Kasday patent.

An objective of this invention is to provide liquid or pumpable polyorganosiloxane compositions that can be cured by a hydrosilation reaction to yield optically transparent elastomers suitable for use as the light transmitting portion of a compressible optical waveguide.

SUMMARY OF THE INVENTION

The curable polyorganosiloxane compositions of this invention comprise at least one vinyl-terminated liquid polydiorganosiloxane, a resinous organosiloxane reinforcing agent that includes diorganovinylsiloxy, triorganosiloxy and $SiO_2$ units, an organosiloxane curing agent containing an average of at least three silicon-bonded hydrogen atoms per molecule, a diorganohydrogensiloxy terminated polydiorganosiloxane as a chain extender, and a platinum-containing hydrosilation catalyst. The molar ratio of vinyl radicals to silicon-bonded hydrogen atoms in the composition is greater than 1.5.

Cured elastomers prepared using the present compositions are compressible, resilient and exhibits a hardness of up to 100 on the Shore 00 durometer scale.

DETAILED DESCRIPTION OF THE INVENTION

This invention provides a curable composition yielding an optically transparent polyorganosiloxane elastomer, said composition comprising the product obtained by blending the following ingredients to homogeneity:

A. at least one liquid polydiorganosiloxane exhibiting a viscosity of from 0.1 to 40 Pa.s at 25° C. and containing a vinyl radical at each of the terminal positions;

B. from 5 to 40 percent, based on the total weight of said composition, of a benzene soluble resinous copolymer consisting essentially of triorganosiloxy units of the general formula $R'''_3SiO_{\frac{1}{2}}$, diorganovinylsiloxy units of the general formula $CH_2=CH(R''')_2SiO_{\frac{1}{2}}$, and $SiO_2$ units, where $R''$ and $R'''$ are individually monovalent hydrocarbon or halohydrocarbon radicals containing from 1 to about 20 carbon atoms and free of ethylenic unsaturation, the molar ratio of combined triorganosiloxy units and diorganovinylsiloxy units to $SiO_2$ units is from 0.7 to 1.2 and said copolymer contains from 0.1 to 8 weight percent of silicon-bonded vinyl radicals;

C. an organohydrogensiloxane curing agent containing at least three silicon-bonded hydrogen atoms per molecule, D. a diorganohydrogensiloxy terminated polydiorganosiloxane containing two silicon-bonded hydrogen atoms and an average of up to 50 diorganosiloxane units per molecule in an amount sufficient to provide from 10 to 85 percent of the silicon-bonded hydrogen atoms present in said composition, and E. a platinum-containing hydrosilation catalyst in an amount sufficient to promote curing of said composition;

with the proviso that said curable composition contains at least 1.5 vinyl radicals for each silicon bonded hydrogen atom present in said composition and the combined concentration of silicon bonded hydrogen in said curing agent and said diorganohydrogensiloxy terminated polydiorganosiloxane is sufficient to cure said composition.

The ingredients of the present curable compositions will now be described in detail.

1. The Polydiorganosiloxane

The polydiorganosiloxane ingredient of the present compositions can be represented by the general formula

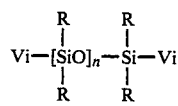

where R represents a monovalent hydrocarbon radical or a monovalent halohydrocarbon radical, Vi represents a vinyl radical, and n represents a degree of polymerization equivalent to a viscosity of from 1 to about 40 Pa.s at 25° C. The radical represented by R can contain from 1 to about 20 carbon atoms. A range of from 1 to 10 carbon atoms is preferred based on the availability of the corresponding monomers. Most preferably R is methyl, phenyl or 3,3,3,-trifluoropropyl, this preference being based on the availability of the reactants typically used to prepare the polydiorganosiloxane.

The reaction mixture can contain a single polydiorganosiloxane ingredient. Alternatively two or more polydiorganosiloxanes of different molecular weights can be present. We have found that the physical properties of the cured elastomer, particularly resiliency and tear strength, are improved by using a combination of high and low molecular weight polydiorganosiloxanes. In preferred embodiments the low molecular weight species exhibits a viscosity of from about 0.1 to about 3 Pa.s at 25° C. and the high molecular weight species exhibits a viscosity of from 20 to about 40 Pa.s at 25° C.

While not willing to be bound by any theory, the improvement in physical properties observed using the preferred polydiorganosiloxane compositions described hereinabove is believed to result from a variation in crosslink density within the cured elastomer. This concept is explained in greater detail hereinbelow.

2. The Resinous Organosiloxane Copolymer

Because the present elastomers must be optically transparent, solid reinforcing agents such as finely divided silica typically cannot be used. Instead, the required reinforcement is obtained by using from about 5 to about 40 percent, based on the weight of the curable composition employed to prepare the elastomer, of the resinous vinyl-containing organosiloxane copolymer referred to hereinabove. These copolymers react during curing and are thereby incorporated into the structure of the final elastomer. We believe that less than about 5 percent by weight of the copolymer will usually not impart the required resiliency and toughness to the cured elastomer, while more than about 40 percent by weight of the copolymer may increase the viscosity of the elastomer precursor to the extent that it cannot be readily blended and poured or otherwise transferred from one location to another under conventional conditions of temperature and pressure. A more serious disadvantage of using too much of the resinous copolymer is an unacceptable decrease in the compressibility of the cured elastomer. The surface of preferred elastomers can be flexed by exerting light to moderate finger pressure.

The resinous copolymer contains repeating units of the general formula $SiO_2$ in addition to triorganosiloxy units of the general formulae $R''_3SiO_{\frac{1}{2}}$ *diorganovinylsiloxy units of the general formula* $CH_2=CH(R''')_2SiO_{\frac{1}{2}}$. In these formula R'' and R''' are individually monovalent hydrocarbon or halohydrocarbon radicals containing from 1 to about 20 carbon atoms, as previously defined for the R radicals of the polydiorganosiloxane component, and both R'' and R''' are free of ethylenic unsaturation.

The molar ratio of the combination of triorganosiloxy units and diorganovinylsiloxy units to $SiO_2$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy: $SiO_2$ units is 0.08-0.1:0.06-1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's procuct with the required amount of a hexaorganodisilazane or a hexaorganodisiloxane wherein each silicon atom contains a vinyl radical and two methyl or other hydrocarbon radicals represented by R'' in the foregoing formula.

To ensure compatibility of the reactants and transparency of the cured polyorganosiloxane elastomer it is preferable that the silicon bonded hydrocarbon radicals present on the polydiorganosiloxane, curing agent and resinous reinforcing agent be identical. Most preferably these hydrocarbon radicals are methyl or a combination of methyl and either phenyl or 3,3,3-trifluoropropyl, this preference being based on the availability of the intermediates used to prepare the polydiorganosiloxane.

3. The Curing Agent and Chain Extender

The polydiorganosiloxane ingredient and the resinous organosiloxane copolymer are cured to form an elastomer by a hydrosilation reaction with the silicon-bonded hydrogen atoms present on the curing agent and the chain extender.

The curing agent contains from as few as four silicon atoms per molecule up to an average of 20 or more, and can have a viscosity of up to 10 Pa.s higher at 25° C. This ingredient also contains at lease three silicon-bonded hydrogen atoms per molecule. The repeating units that can be present in this ingredient include but are not limited to $HSiO_{1.5}$, $R'HSiO$ and/or $R'_2HSiO_{0.5}$ in addition to one or more of monoorganosiloxy, diorganosiloxane, triorganosiloxy and $SiO_2$ units. In these formulae R' is a monovalent hydrocarbon or halocarbon radical as defined hereinabove for the R radical of the polydiorganosiloxane. Alternatively the organohydrogensiloxane can be a cyclic compound containing diorganosiloxane and organohydrogensiloxane units or a compound of the formula Si(OSiR'$_2$H)$_4$. Most preferably R' is methyl and the curing agent is a linear trimethylsiloxy terminated dimethylsiloxane/methylhydrogensiloxane copolymer containing an average of from 10 to about 50 repeating units per molecule of which from 3 to 5 are methylhydrogensiloxane.

To achieve a combination of compressive strength, compressibility and resilience in the cured elastomer, a relatively low molecular weight diorganohydrogensiloxy terminated polydiorganosiloxane referred to hereinbefore as a "chain extender" is included in the present compositions. The chain extender contains an average of up to 50 diorganosiloxane units per molecule and two silicon-bonded hydrogen atoms. The silicon-bonded hydrogens are located at the terminal positions of the molecule.

Preferred chain extenders contain from 10 to 50 dimethylsiloxane units per molecule. Chain extenders of this type are described, for example, in the aforementioned U.S. Pat. No. 3,697,473, which issued to Polmanteer et al. on Oct. 10, 1972 and is incorporated herein by reference as a teaching of suitable chain extenders.

The chain extender provides from 10 to 85 percent of the silicon bonded hydrogen atoms present in the curable compositions of this invention. Preferably this range is from about 30 to about 70 percent and the chain extender is a dimethylhydrogensiloxy terminated polydimethylsiloxane.

The molecular weight of the polydiorganosiloxane and curing agent together with the number and distribution of the silicon-bonded hydrogen atoms and vinyl radicals within the reactants used to prepare the elastomer will determine the location of crosslinks in the cured material. The concentration of crosslinks per unit area is often referred of as the "crosslink density" and determines certain physical properties of the cured elastomer, particularly hardness, compressibility and resiliency. The particular combinations of polydiorganosiloxane (s), curing agent(s) and resinous organosiloxane copolymer yielding the optimum combination of these physical properties can readily be determined by routine experimentation with a knowledge of this invention.

The molar ratio of vinyl or other ethylenically unsaturated hydrocarbon radicals to silicon bonded hydrogen atoms and the relative concentrations of silicon bonded hydrogen in the curing agent and chain extender is critical with respect to the properties of the cure elastomer. The present compositions contain at least 1.5 vinyl or other ethylenically unsaturated hydrocarbon radicals for each silicon bonded hydrogen atom. The optimum ratio of vinyl radicals to silicon bonded hydrogen required to obtain a cured elastomer exhibiting a desired combination of compressibility, toughness and resilience will be determined at least in part by the molecular weight of the polydiorganosiloxane(s), the type of curing agent and the concentration of resinous organosiloxane copolymer.

It will be understood that the concentration of vinyl radicals relative to silicon bonded hydrogen atoms should not exceed a value above which the composition will not cure to yield useful materials exhibiting the properties described hereinbefore. This value is typically about 10 moles of vinyl radicals per mole of silicon-bonded hydrogen. The present compositions preferably contain from two to four moles of vinyl radicals per mole of silicon bonded hydrogen atoms.

It should be understood that allyl or other ethylenically unsaturated hydrocarbon radicals can partially or completely replace the vinyl radicals.

4. The Platinum Containing Catalyst and Optional Inhibitor

Hydrosilation reactions are typically conducted in the presence of a catalyst that is a platinum group metal or a compound of such a metal. Platinum compounds such as hexachloroplatinic acid, and particularly compolexes of these compounds with relatively low molecular weight vinyl-containing organosiloxane compounds are preferred catalysts because of their high activity and compatibility with the organosiloxane reactants. These complexes are described in U.S Pat. No. 3,419,593 that issued to David N. Willing on Dec. 31, 1968. Complexes with low molecular weight organosiloxanes wherein the silicon bonded hydrocarbon radicals are binyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agent, chain extender and platinum-containing catalysts may begin to cure at ambient temperature. To increase the storage stability of these compositions or obtain a longer working time or "pot life", the activity of the catalyst under ambient conditions can be retarded or suppressed by the addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically sugstttuted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 to or more moles of inhibitor per mole of platinum are required. The optimum concentration for a given inhibitor in a given composition can readily be determined by routine experimentation and does not constitute part of this invention.

5. Properties of the Curable Composition and Cured Elastomer

Curable compositions containing the ingredients described in the preceding paragraphs typically inhibits viscosities of up to 100 Pa.s at 25° C. To blending and transfer of the compositions and minimize facilitate entrapment of air during mixing a viscosity of from 0.5 to 10 Pa.s at 25° C. is preferred.

Cured polyorganosiloxane elastomers prepared using the present compositions typically exhibit hardness values of from 5 to about 100 measured on the Shore 00 durometer scale in accordance with test method No. D-2240 of the American Society of Testing and materials (ASTM).

The cured elastomers prepared using the polyorganosiloxane compositions of this invention are optically transparent and suitable for fabricating articles by molding, casting or any other technique conventionally used to process liquid or pumpable polyorganosiloxane compositions. Elastomers exhibiting hardness values of from 5 to about 40 would be particularly suitable materials for the light transmitting portion of optical waveguides. The physical properties of these preferred elastomers, particularly their compressibilty, toughness and resiliency, would make them particularly desirable for fabricating flexible touch position sensitive screens of the type described in U.S. Pat. No. 4,484,179, which issued to Kasday on Nov. 20, 1984.

The following examples disclose preferred curable compositions of this invention. Example 2 is included for comparative purposes to demonstrate the gradual hardening that characterizes prior art compositions containing the same types of ingredients as those of the present invention but with a stoichiometric excess of silicon bonded hydrogen atoms in place of the stoichiometric excess of vinyl radicals that characterizes the present compositions. All parts and percentages disclosed in the examples are by weight unless otherwise specified.

EXAMPLE 1

The compressibility and resiliency of an elastomer prepared using a preferred curable composition of this invention were demonstrated by incorporating the elastomer into a touch position sensitive optical waveguide of the type disclosed in U.S. Pat. No. 4,484,179, which issued to Kasday on Nov. 20, 1984.

The curable composition was prepared by blending the following materials to form a homogeneous mixture:

56.0 parts of a dimethylvinylsiloxy endblocked polydimethylsiloxane having a viscosity of about 2.1 Pa.s at 25° C. (ingredient I);

44.0 parts dimethylvinylsiloxy endblocked polydimethylsiloxane having a viscosity of about 30 Pa.s at 25° C. (ingredient II);

45.2 parts of a benzene soluble resinous copolymer containing triorganosiloxy units and $SiO_2$ units in the mol ratio of about 0.7 mol of triorganosiloxy unit per mol of $SiO_2$ unit where the triorganosiloxy units are trimethylsiloxy units and dimethylvinylsiloxy units and the resin copolymer has from 1.4 to 2.2 weight percent silicon-bonded vinyl radicals (ingredient III);

7.85 parts of a dimethylhydrogensiloxy endblocked polydimethylsiloxane containing an average of 20 dimethylsiloxane units per molecule;

2.94 parts of a trimethylsiloxy endblocked dimethylsiloxane/methyl-hydrogensiloxane copolymer exhibiting a viscosity of 0.3 Pa. s and containing 0.16 percent by weight of silicon-bonded hydrogen atoms (ingredient IV);

0.3 parts of a hexachloroplatinic acid complex of divinyltetramethyldisiloxane diluted with an amount of a liquid dimethylvinylsiloxy endblocked polydimethylsiloxane sufficient to provide 0.7 weight percent platinum (ingredient V); and 0.2 part of cyclic methylvinylsiloxane oligomers as a platinum catalyst inhibitor (ingredient VI).

The resultant curable composition contained 2.23 vinyl radicals for each silicon-bonded hydrogen atom.

The curable composition was poured into a vertically oriented container fabricated by clamping two superimposed sheets of a polyurethane film along three of the four mating edges. The polyurethane is available as Estane(R) 5887. The sheets measured 46 by 47 cm. and were 0.5 mm. thick.

The inner walls of the container had previously been coated with a primer solution prepared by combining 120 grams of dry methylene choloride, 13.5 grams of a trimethylsiloxy endblocked polymethylhydrogensiloxane having a viscosity of about 0.13 Pa.s at 25° C. and a silicon-bonded hydrogen atom content of about 1.6 percent by weight, and 2 drops of a hexachloroplatinic acid complex of divinyltetramethyldisiloxane diluted with dimethylvinylsiloxy endblocked polydimethylsiloxane to provide 0.7 weight percent platinum.

The filled container was then secured between two plates separated by 3.2 mm spacers while maintaining the container in a substantially vertical position, and the entire assembly was placed in an oven heated to a temperature of 66° C. After being heated for 30 minutes to cure the composition to an elastomer the assembly was removed from the oven.

A rectangular section measuring 18.3 by 23.4 cm. was cut from the container of cured elastomer to form an optical waveguide. The layer of exposed elastomer around the perimeter of the waveguide was coated using the same solution used to coat the film from which the waveguide was prepared. The waveguide was then heatedat a temperature of 66° C. for one hour to cure the coating and complete curing of the elastomer.

When cured at a temperature of 150° C. for 20 minutes in the absence of the polyurethane film the elastomer exhibited a hardness of 11 on the Shore 00 durometer scale. The final optically transparent waveguide was 4.6 mm thick, and required a force of 117 g. applied using a 1.6 cm-diameter spherical foot to depress the surface of the waveguide a distance of 1 mm. The waveguide required less than one second to recover its initial thickness following removal of this force.

The compressive strength of the waveguide was measured by determining the force required to fracture the surface of the waveguide using a 1.6 cm-diameter spherical foot. This force was 17.6 kg.

The wave guide was then subjected to an accelerated aging test by heating it at 66° C. for 46 days to determine to effect on the compressibility of the waveguide. After 14 days the force required to compress a surface of the waveguide a distance of 1.0 mm was 123 grams. After 49 days this force had incereased to 130 grams. This represented an increase of 5 percent from the initial value.

EXAMPLE 2 (Comparative Example)

This example demonstrates the gradual and irreversible hardening exhibited by elastomers prepared using prior art curable compositions containing a stoichiometric excess of silicon hydrogen atoms. The composition is one of those disclosed in U.S. Pat. No. 4,535,141, which issued to Kroupa on Aug. 13, 1985.

The external portion of an optical waveguide was formed by heat sealing a sheet of the polyurethane film described in the preceding example 1 to a both sides of a rectangular frame formed from the same material. The inner dimensions of the frame were 16.4 cm. by 21.3 cm., and the frame was 0.5 cm. thick. The surfaces of the film forming the inner wal of the container were coated with the primer solution of example 1 along the entire border where the film contacted the frame. the resultant container was filled with a curable composition prepared by blending together the following materials to form a homogeneous mixture.

100 parts of a mixture of three dimethylvinylsiloxy terminated polydimethylsiloxanes identified as a, b and c. Polydimethylsiloxane a constituted 35 percent by weight of the mixture and exhibited a viscosity of about 2 Pa.s at 25° C., polydimethylsiloxane b constituted 52 percent by weight of the mixture and exhibited a viscosity of about 30 Pa.s at 25° C., polydimethylsiloxane c constituted the remaining 13 and percent by weight of the mixture and exhibited a viscosity of about 0.4 Pa.s at 25° C.;

19 parts of the benzene soluble resinous copolymer described in the preceding Example 1, 0.7 part of a curing agent consisting essentially of a trimethylsiloxy endblocked dimethylsiloxane/methylhydrogensiloxane copolymer having an average of five methylhydrogensiloxane units and three dimethylsiloxane units per molecule and a silicon-bonded hydrogen atom content in the range of about 0.7 to 0.8 weight percent;

28 parts of the dimethylhydrogensiloxy terminated polydimethylsiloxane described in the preceding Example 1;

0.18 part of the platinum-containing hydrosilation catalyst described in Example 1; and 0.26 part of cyclic methylvinylsiloxane oligomers as a catalyst inhibitor.

The resultant composition contained 0.365 vinyl radical per silicon-bonded hydrogen atom. The filled container was secured between two plates separated by 0.5 cm. -thick spacers and the entire assembly stored at room temperature for 8 hours to cure the elastomer, followed by a postcure period of 2 hours in an oven maintained at 66° C.

The cured product was an optically transparent waveguide of about 50 mm in thickness and required a force of 55 grams to depress the surface a distance of 1 mm. The waveguide was subjected to the accelerated aging test described in the preceding Exampl 1. After 7 days the force required to depress the surface of the waveguide had increased to 110 grams. After 28 days this was 400 grams, an increase of 727 percent from the initial value. The requirement to exert this amount of force to depress the surface of a touch sensitive optical waveguide of the type described in the Kasday patent discussed in a previous section of this specification would not be acceptable to a potential user of the waveguide.

EXAMPLE 3 (Comparative Example)

This example demonstrates the relatively poor compressive strength exhibited by cured elastomers prepared using curable compositions that omit the chain extender ingredient of the present compositoins.

A curable compositon was prepared by blending the following amounts of ingredients I to VI defined in the preceding example 1 to obtain a homogeneous mixture.

| Ingredient | Parts |
| --- | --- |
| I | 57 |
| II | 43 |
| III | 46 |
| IV | 7.7 |
| V | 0.3 |
| VI | 0.2 |

The molar ratio of vinyl radicals to silicon-bonded hydrogen atoms in this curable composition was 3.0 A sample of the composition was cured outside of the container by heating it for 20 minutes at 150° C. The durometer hardness of this cured elastomer was 20 on the Shore 00 scale.

A waveguide was prepared using this curable composition together with the procedure and polyurethane film described in the preceding Example 1. The compressive strength of the waveguide following postcuring was 6.75 kilograms, compared with 17.6 kilograms for the waveguide described in the preceding Example 1, which was prepared using a curable composition of this invention containing a chain extender.

That which is claimed is:

1. A curable composition yielding an optically transparent polyorganosiloxane elastomer, said cmposition comprising the product obtained by blending the following ingredients to homogeneity:
   A. at least one liquid polydiorganosiloxane exhibiting a viscosity of from 0.1 to 40 Pa.s at 25° C. and containing a vinyl radical at each of the two terminal positions;
   B. from 5 to about 40 percent, based on the total weight of said composition, of a benzene soluble resinous copolymer consisting essentially of triorganosiloxy units of the general formula $R''_3SiO_{\frac{1}{2}}$, diorganovinylsiloxy units of the general formula $CH_2=CH(R''')_2SiO_{\frac{1}{2}}$, and $SiO_2$ units, where $R'$ and $R'''$ are individually monovalent hydrocabon or halohydrocarbon radicals containing from 1 to about 20 carbon atoms and free of ethylenic unsaturation, the molar ratio of combined triorganosiloxy units and diorganovinylsiloxy units to $SiO_2$ units is from 0.7 to 1.2 and said copolymer contains from 0.1 to 8 weight percent of silicon-bonded vinyl radicals;
   C. an organohydrogensiloxane curing agent containing at least three silicon-bonded hydrogen atoms per molecule,
   D. a diorganohydrogensiloxy terminated polydiorganosiloxane containing two silicon-bonded hydrogen atoms and an average of up to 50 diorganosiloxane units per molecule in an amount sufficient to provide from 10 to 85 percent of the silicon-bonded hydrogen atoms present in said composition, and
   E. a platinum-containing hydrosilation catalyst in an amount sufficient to promote curing of said composition; with the proviso that the composition contains at least 1.5 vinyl radicals for each silicon-bonded hydrogen atom, and the combined concentration of said curing agent and said diorganohydrogensiloxy terminated polydiorganosiloxane is sufficient to cure said composition.

2. A composition according to claim 1 where the vinyl-containing polydiorganosiloxane (A) is represented by the general formula

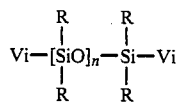

where R represents a monovalent hydrocarbon radical or a monovalent haloydrocarbon radical, Vi represents a vinyl radical, and n represents a degree of polymerization equivalent to a viscosity of from 40 Pa.s at 25° C.

3. A composition according to claim 2 where R represents a monovalent hydrocarbon or halogenated hydrocarbon radical containing from 1 to 10 carbon atoms, said organohydrogensiloxane (C) contains at least three repeating units per molecule that are selected from the group consisting of $HSiO_{1.5}$, $R'HSiO_{0.5}$, where R' represents a monovalent hydrocarbon or hologenated hydrocarbon radical containing from 1 to 10 carbon atoms, and any remaining repeating units are selected from the group consisting of monoorganosiloxane, diorganosiloxane, triorganosiloxy and $SiO_2$.

4. A composition according to claim 3 where the viscosity of said composition does not exceed 100 Pa.s at 25° C., and R, R', R" and R'" are methyl, phenyl or 3,3,3-trifluoropropyl.

5. A composition according to claim 4 where R, R', R" and R'" are methyl, the curing agent comprises a dimethylsiloxane/methylhydrogensiloxane copolymer containing an average of from 10 to 50 repeating units and from 3 to 5 silicon-bonded hydrogen atoms per molecule, the composition contains from two to four moles of vinyl radicals per mole of silicon-bonded hydrogen atoms, the silicon-bonded hydrocarbon radicals of the diorganoydrohensiloxy terminated polydiorganosiloxane are methyl and said platinum-containing hydrosilation catalyst is a reaction product of hexachloroplatinic acid and a vinyl containing organosiloxane compound.

6. A composition according to claim 5 where said composition contains two of said liquid polydiorganosiloxanes, the first of which exhibits a viscosity of from 0.1 to 3 Pa.s at 25° C. and the second of which exhibits a viscosity of from 20 to 40 Pa.s at 25° C., and the dimethylhydrogensiloxy terminated polydimethylsiloxane contains from 30 to 70 mole percent of the silicon-bonded hydrogen atoms present in said composition.

7. A composition according to claim 6 that contains a platinum catalyst inhibitor.

8. A composition according to claim 7 where said platinum catalyst inhibitor is an acetylenic alcohol.

* * * * *